Nov. 3, 1925.

T. V. BUCKWALTER

POCKET BEARING CONSTRUCTION

Filed June 21, 1924

1,559,670

Inventor:
Tracy V. Buckwalter,
by his Attorneys.

Patented Nov. 3, 1925.

1,559,670

UNITED STATES PATENT OFFICE.

TRACY V. BUCKWALTER, OF CANTON, OHIO, ASSIGNOR TO TIMKEN ROLLER BEARING COMPANY, OF CANTON, OHIO, A CORPORATION OF OHIO.

POCKET-BEARING CONSTRUCTION.

Application filed June 21, 1924. Serial No. 721,459.

*To all whom it may concern:*

Be it known that I, TRACY V. BUCKWALTER, a citizen of the United States, and a resident of the city of Canton, in the county of Stark and State of Ohio, have invented a new and useful Improvement in Pocket-Bearing Constructions, of which the following is a specification.

My invention relates to bearing constructions, that is, to that type of bearing construction wherein a roller bearing is interposed between two shafts in axial alinement, one of said shafts having a recess for the bearing, and the other shaft extending into said recess. The principal objects of the present invention are compactness and economy, and also to obtain a maximum bearing capacity for a given overall diameter of a pinion at the end of the recessed shaft. The invention consists principally in forming the surface of the end portion of the inner shaft into a cone whose apex will coincide or approximately coincide with the apexes of the bearing surfaces of the roller bearing; it also consists either in forming the wall of the recess as a bearing surface for the rollers or else in forming the wall of said recess into a conical surface substantially parallel with the conical surface of the end portion of the inner shaft. It also consists in the parts and combinations of parts hereinafter described and claimed.

Figure 1:
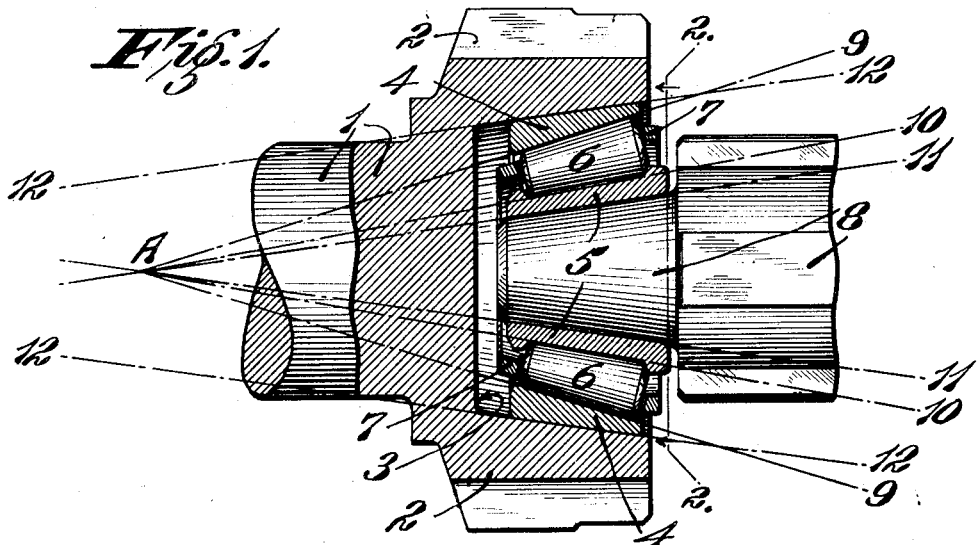
Figure 2:
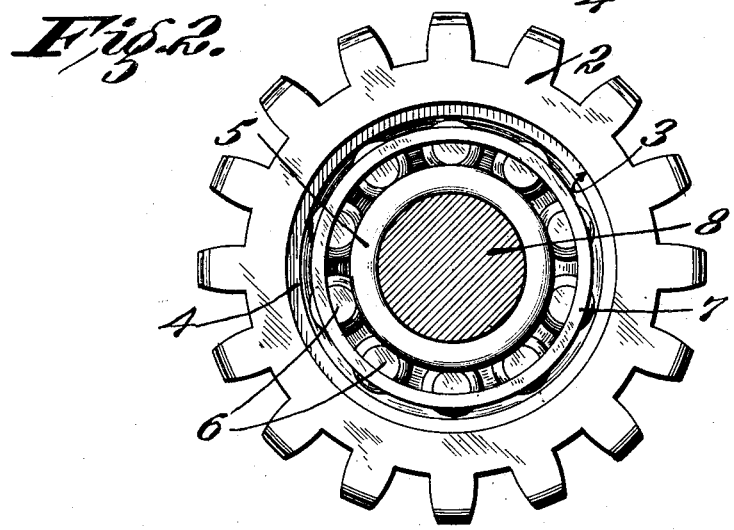
Figure 3:
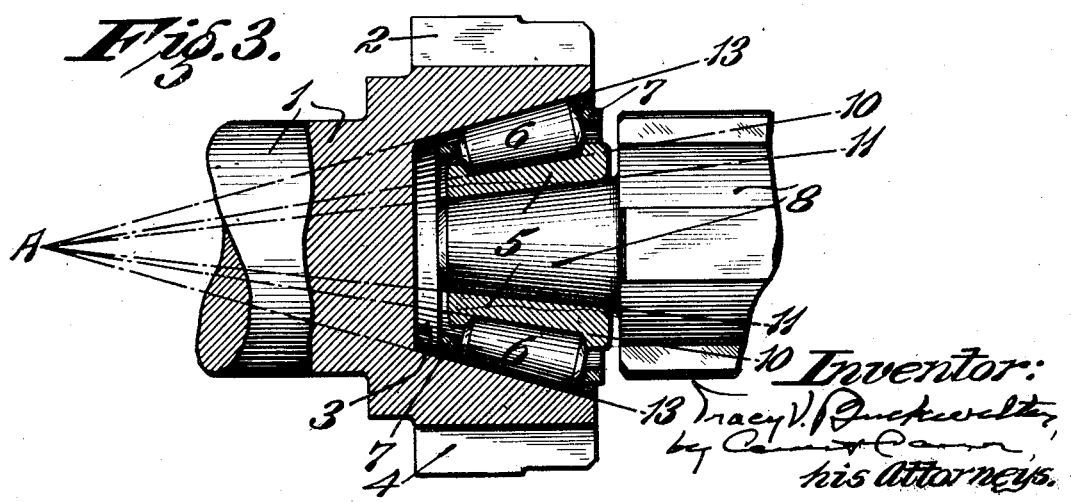

In the accompanying drawing, wherein like numerals refer to like parts wherever they occur, Fig. 1 is a longitudinal sectional view illustrating a construction embodying my invention;

Fig. 2 is a cross-sectional view on the line 2—2 of Fig. 1 looking in the direction of the arrows; and Fig. 3 is a view similar to Fig. 1 and illustrating a modification wherein the separate roller bearing cup is eliminated and the inner wall of the recess functions as the outer bearing member.

Referring to Fig. 1 of the drawing, a shaft 1 has at its end an enlarged head that is formed into a pinion 2, and a large axial pocket or recess 3 is formed in said head or pinion. In this recess is mounted the cup 4 of a roller bearing which comprises said cup or outer bearing member, a cone 5 or inner bearing member, and a circular series of conical rollers 6 together with a suitable cage 7 therefor. The cone or inner bearing member is fitted on the end of a second shaft 8 in axial alinement with said first mentioned shaft. The construction so far described has been used in automotive construction, wherein the pinion is a constant mesh pinion. In this relation, the pocket bearing takes very heavy loads on gear drives, particularly second gear, and takes considerable chattering without rotation on direct drive. As it is obviously objectionable to increase the size of the constant mesh pinion, it is important to obtain the maximum bearing capacity consistent with the small diameter of said pinion.

According to the present invention, the rollers 6 are made with a rather steep taper, whereby their large ends may be made with a larger diameter than would otherwise be practicable and whereby also they are better adapted for withstanding end thrust. The bearing surfaces of the cup and cone (whose projections are indicated by the dot-and-dash lines A—9 and A—15, respectively) are designed for cooperation with said rollers and their conical surfaces have a common apex A in the axis of the shaft. The end portion of the inner shaft 8 is tapered so that the apex of its conical surface (whose projection is indicated by the dot-and-dash lines A—11) will coincide or approximately coincide with the common apex of the bearing surfaces of the roller bearing members. The bore or inner surface of the cone corresponds with the taper of the end of said shaft and fits thereover. By this arrangement, the thickness of the cone is not only more nearly uniform than has heretofore been the practice, but the thickness of the cone may be reduced to that needed for its own strength in resisting the stresses thereon. Thus, the bore of the cone and consequently the thickness of the tapered portion of the shaft inside of said bore is increased beyond what has heretofore been practicable, and the maximum increase is at the outer end of the bore, where it is most desirable to have the supporting portion of the shaft of maximum diameter.

In the present construction, the wall of the recess or pocket in the shaft or pinion tapers substantially parallel with the taper of the bore of the inner bearing member, (as indicated by the dot-and-dash lines 12—12) and consequently the taper of the outer surface of the cup or outer bearing member, which fits in said recess or pocket, is substantially parallel with the taper of the bore of the inner bearing member and of the conical end portion of the shaft. By this arrangement, the thickness of the metal inside the teeth of the pinion is greatest at the bottom of the pocket where it is most needed for resisting the stresses to which the structure is subject; and consequently such pocket may be made of larger diameter for a given pinion than has heretofore been practicable.

The construction hereinbefore described has the obvious advantages that it permits the use of larger and more steeply tapered rollers than have heretofore been practicable with a pinion of given size; also that the making of the inner bearing member of nearly uniform thickness permits the portion of the shaft that extends therein to be made considerably thicker and stronger than has heretofore been practicable; and the tapering of the outer surface of the cup substantially parallel with the bore of the inner bearing member or cone permits the pocket in the pinion to be made of greater diameter than has heretofore been practicable for a given size of pinion.

In the modification illustrated in Fig. 3, the outer bearing cup, as a separate member, is dispensed with, and the surface 13 of the wall of the recess is adapted for direct cooperation with the rollers. In this construction, the taper of the recess or pocket of the pinion is determined by its function as a bearing surface for cooperation with the rollers.

What I claim is:

1. The combination of two shafts in axial alinement and a conical roller bearing between them, one of said shafts having an axially conically recessed gear at the end thereof, and the adjacent end of the other shaft being tapered and extending inside of the recess, said bearing comprising a cone mounted on said tapered end and conical rollers, and the apex of the inner surface of said cone being substantially coincident with the apex of the outer or bearing surface thereof.

2. The combination of two shafts in axial alinement and a conical roller bearing between them, one of said shafts having an axially conically recessed gear at the end thereof, and the adjacent end of the other shaft being tapered and extending inside of the recess, said bearing comprising a conical cup mounted in said recess, a cone mounted on said tapered end and conical rollers between said cup and cone, and the apex of the inner surface of said cone being substantially coincident with the apex of the bearing surfaces of said cone and cup.

3. The combination of two shafts in axial alinement and a roller bearing between them, one of said shafts having an axially conically recessed gear at the end thereof, and the adjacent end of the other shaft being tapered and extending inside of said recess, said bearing comprising a conical cup mounted in said recess, a cone mounted on said tapered end and conical rollers between said cup and cone, the outer surface of said cup and the inner surface of said cone being substantially parallel and the apex of the inner surface of said cone being substantially coincident with the apex of the bearing surfaces of said cone and cup.

Signed at Canton, Ohio, this 16th day of June 1924.

TRACY V. BUCKWALTER.